United States Patent
Tanaka

(10) Patent No.: US 8,817,141 B2
(45) Date of Patent: Aug. 26, 2014

(54) IMAGE PROCESSING DEVICE AND METHOD, RECORDING MEDIUM, AND IMAGING DEVICE

(71) Applicant: FUJIFILM Corporation, Tokyo (JP)

(72) Inventor: Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/163,782

(22) Filed: Jan. 24, 2014

(65) Prior Publication Data
US 2014/0139709 A1    May 22, 2014

Related U.S. Application Data

(63) Continuation of application No. PCT/JP2012/065837, filed on Jun. 21, 2012.

(30) Foreign Application Priority Data

Sep. 29, 2011 (JP) ................... 2011-215057

(51) Int. Cl.
*H04N 5/335* (2011.01)

(52) U.S. Cl.
USPC .......................... 348/273; 348/275; 348/222.1

(58) Field of Classification Search
USPC ........................ 348/222.1, 272, 273, 275, 280
See application file for complete search history.

(56) References Cited

U.S. PATENT DOCUMENTS

| | | | |
|---|---|---|---|
| 6,222,641 B1 | 4/2001 | Karidi | |
| 6,882,364 B1 | 4/2005 | Inuiya et al. | |
| 2006/0119724 A1 | 6/2006 | Inuiya | |
| 2010/0085452 A1* | 4/2010 | Hirakawa et al. | 348/273 |
| 2010/0245632 A1 | 9/2010 | Suzuki | |
| 2011/0134291 A1* | 6/2011 | Rueckert et al. | 348/280 |
| 2012/0293695 A1 | 11/2012 | Tanaka | |

FOREIGN PATENT DOCUMENTS

| | | |
|---|---|---|
| CN | 102870417 A | 1/2013 |
| JP | 2000-184386 A | 6/2000 |
| JP | 2001-148797 A | 5/2001 |
| JP | 2002-520915 A | 7/2002 |
| JP | 2005-130241 A | 5/2005 |
| JP | 2005-136766 A | 5/2005 |
| JP | 2005-167896 A | 6/2005 |
| JP | 2007-36765 A | 2/2007 |
| JP | 2010-239492 A | 10/2010 |

OTHER PUBLICATIONS

International Search Report, issued in PCT/JP2012/065837, dated Sep. 11, 2012.
Written Opinion of the International Searching Authority, issued in PCT/JP2012/065837, dated Sep. 11, 2012.
Chinese Office Action of Application No. 201280026611.2 dated Jun. 13, 2014.

* cited by examiner

*Primary Examiner* — Tuan Ho
(74) *Attorney, Agent, or Firm* — Birch, Stewart, Kolasch & Birch, LLP

(57) ABSTRACT

A method for image processing according to one aspect of the presently disclosed subject matter includes: a step of acquiring an image taken by an imaging device including an image sensor having pixel configuration with repeating cycles of M×N (M, N: integers of 2 or more) pixels; (a) a step of setting a target pixel in the acquired image and extracting K×L (K, L: integers of M<K and N<L) pixels based on the target pixel; (b) a step of calculating a pixel value of the target pixel with an operation with use of a filter which has a K×L filter size and which has specified filter coefficients arrayed therein; and a step of repeatedly executing the step (a) and the step (b) while moving the target pixel one pixel at a time with respect to the acquired image.

18 Claims, 20 Drawing Sheets

FIG.1A

BASIC ARRAY PATTERN (6 X 6 PIXELS)

FIG.1B

| 1 | 1 | 1 | 2 | 2 | 2 | 1 | 1 | 1 |
|---|---|---|---|---|---|---|---|---|
| 1 | 1 | 1 | 2 | 2 | 2 | 1 | 1 | 1 |
| 1 | 1 | 1 | 2 | 2 | 2 | 1 | 1 | 1 |
| 2 | 2 | 2 | 4 | 4 | 4 | 2 | 2 | 2 |
| 2 | 2 | 2 | 4 | 4 | 4 | 2 | 2 | 2 |
| 2 | 2 | 2 | 4 | 4 | 4 | 2 | 2 | 2 |
| 1 | 1 | 1 | 2 | 2 | 2 | 1 | 1 | 1 |
| 1 | 1 | 1 | 2 | 2 | 2 | 1 | 1 | 1 |
| 1 | 1 | 1 | 2 | 2 | 2 | 1 | 1 | 1 |

FILTER COEFFICIENTS (9 X 9)

ASSIGNMENT OF FILTER COEFFICIENTS

ASSIGNMENT OF FILTER COEFFICIENTS

BASIC ARRAY PATTERN (3 X 3 PIXELS)

FIG.4A

| 0 | 1 | 1 | 1 | 0 |
|---|---|---|---|---|
| 1 | 2 | 3 | 2 | 1 |
| 1 | 3 | 4 | 3 | 1 |
| 1 | 2 | 3 | 2 | 1 |
| 0 | 1 | 1 | 1 | 0 |

FILTER COEFFICIENTS

FIG.4B

| | $j_1$ | $j_2$ | $j_3$ | $j_4$ | $j_5$ |
|---|---|---|---|---|---|
| $i_1$ | 0 | 1 | 1 | 1 | 0 |
| $i_2$ | 1 | 2 | 3 | 2 | 1 |
| $i_3$ | 1 | 3 | 4 | 3 | 1 |
| $i_4$ | 1 | 2 | 3 | 2 | 1 |
| $i_5$ | 0 | 1 | 1 | 1 | 0 |

⇒

| $(j_2+j_5)$ | | $(j_1+j_4)$ |
|---|---|---|
| 1 | 1 | 1 |
| 3 | 3 | 3 |
| 4 | 4 | 4 |
| 3 | 3 | 3 |
| 1 | 1 | 1 |

CALCULATION OF COEFFICIENTS ON RIGHT AND LEFT SIDES

FIG.4C

| | $(j_2+j_5)$ | | $(j_1+j_4)$ |
|---|---|---|---|
| $i_1$ | 1 | 1 | 1 |
| $i_2$ | 3 | 3 | 3 |
| $i_3$ | 4 | 4 | 4 |
| $i_4$ | 3 | 3 | 3 |
| $i_5$ | 1 | 1 | 1 |

⇒

| | $(j_2+j_5)$ | | $(j_1+j_4)$ | |
|---|---|---|---|---|
| | 4 | 4 | 4 | $(i_2+i_5)$ |
| | 4 | 4 | 4 | |
| | 4 | 4 | 4 | $(i_1+i_4)$ |

CALCULATION OF COEFFICIENTS ON UPPER AND LOWER SIDES

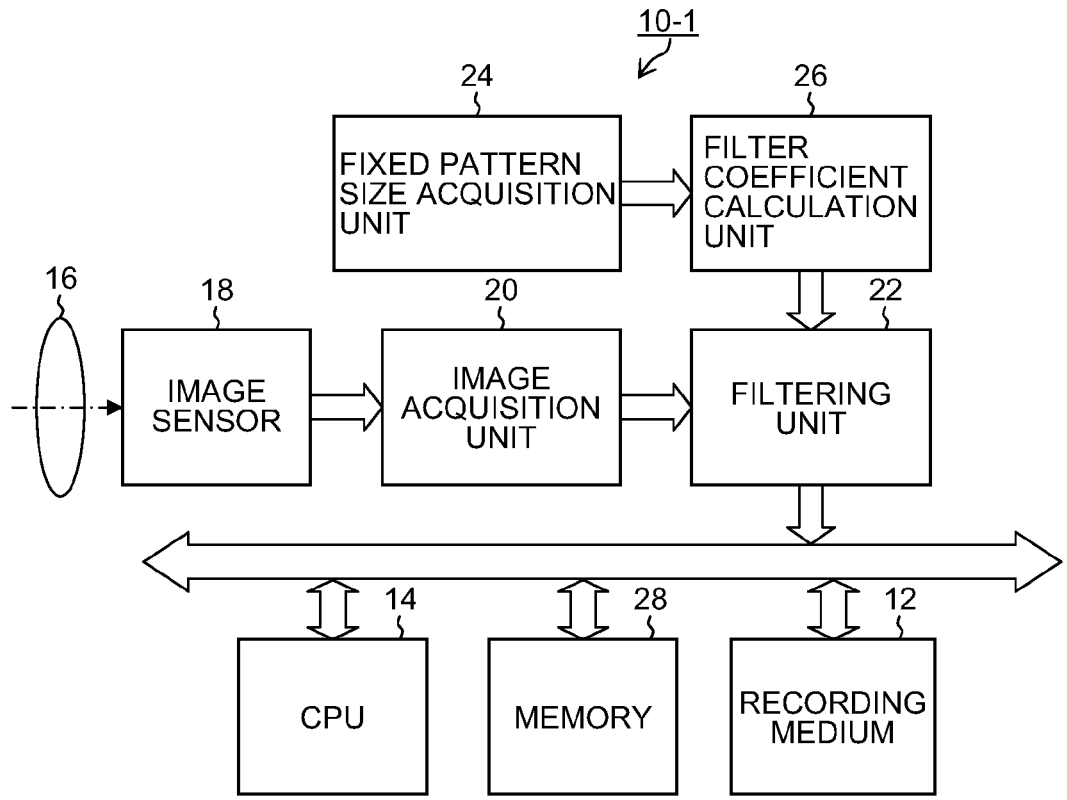
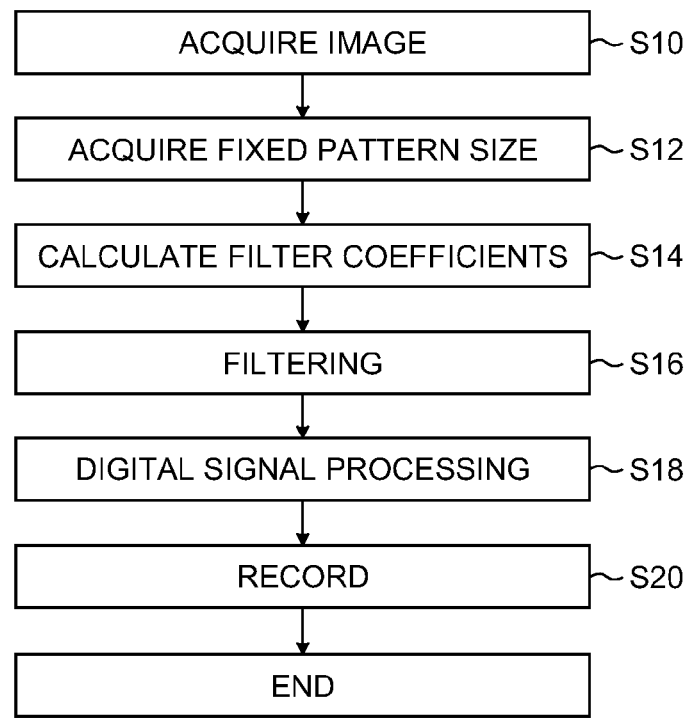

BASIC ARRAY PATTERN (6 X 6 PIXELS) AND FILTER COEFFICIENTS (8 X 8)

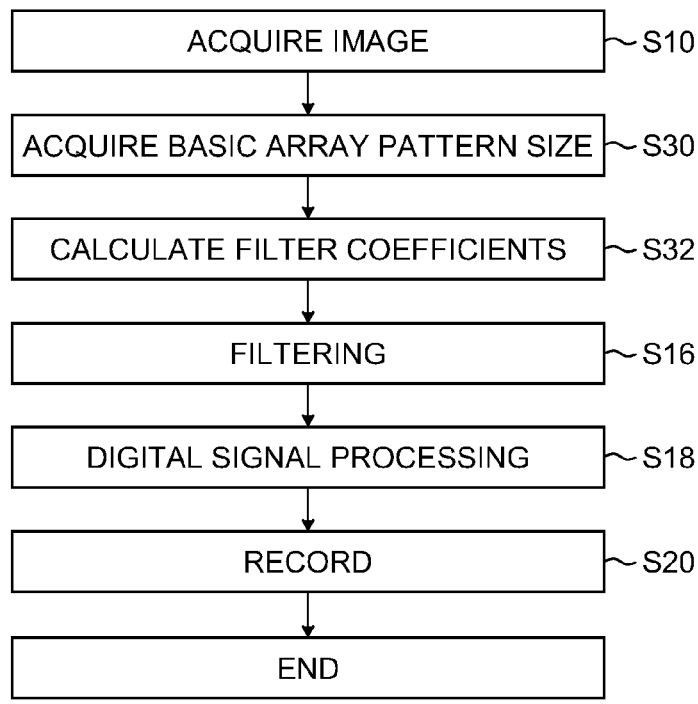
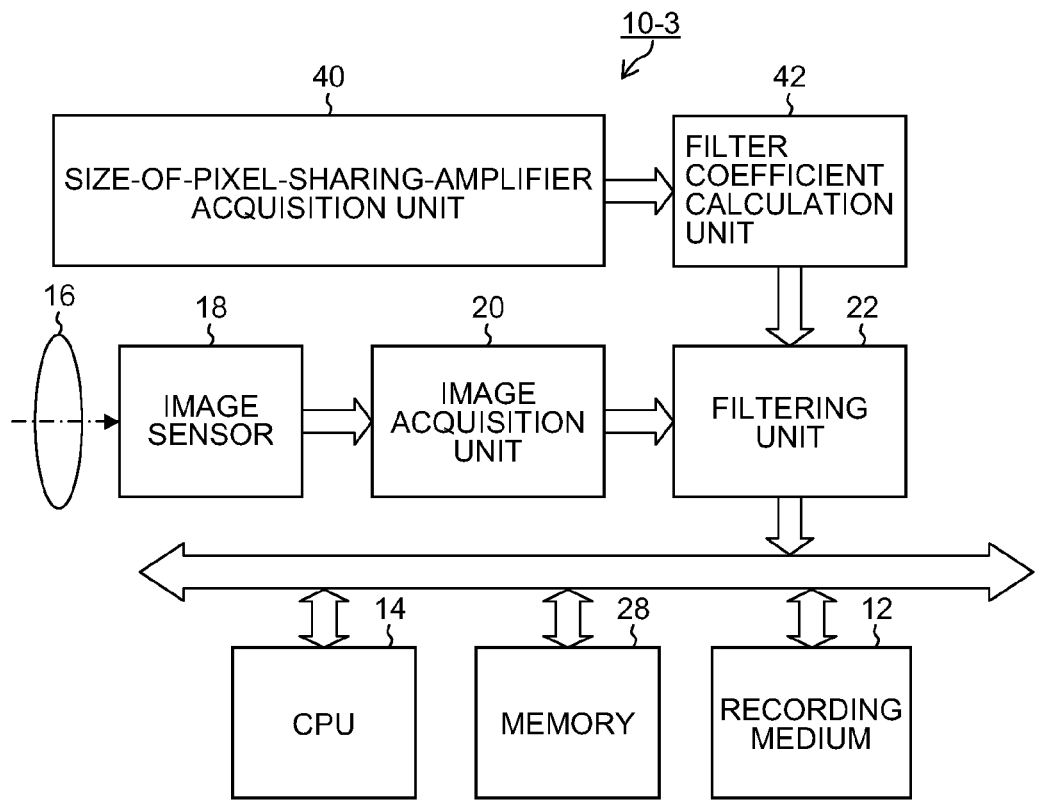

AMPLIFIER SHARING PIXELS (2 X 2 PIXELS)

FILTER COEFFICIENTS (4 X 4)

BASIC ARRAY PATTERN (3 X 3 PIXELS)

SIZE OF PIXELS SHARING AMPLIFIER (2 X 2 PIXELS)

FILTER COEFFICIENTS (8 X 8)

BASIC ARRAY PATTERN (3 X 3 PIXELS)

| 0 | 1 | 1 | 1 | 0 |
|---|---|---|---|---|
| 1 | 2 | 3 | 2 | 1 |
| 1 | 3 | 4 | 3 | 1 |
| 1 | 2 | 3 | 2 | 1 |
| 0 | 1 | 1 | 1 | 0 |

FILTER COEFFICIENTS (5 X 5)

VALUE INCREASED DUE TO LEAKAGE FROM R PIXEL

COLOR MIXTURE OF G PIXEL    VALUE UNCHANGED WITH NO LEAKAGE FROM B PIXEL

BASIC ARRAY PATTERN (6 X 6 PIXELS)

RELATED ART

SIZE OF PIXELS SHARING AMPLIFIER (2 X 2 PIXELS)

RELATED ART

FIG.23A

FILTER COEFFICIENTS WITH CENTER-WEIGHTED WEIGHTING

RELATED ART

FIG.23B

FILTER APPLIED WITH PIXELS BEING MOVED

RELATED ART

FIG.23C

FILTER APPLIED WITH PIXELS BEING MOVED

RELATED ART

FIG.24

|   |   |   |   |   |   |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |

UNIFORM FILTER COEFFICIENTS

RELATED ART

IMAGE PROCESSING DEVICE AND METHOD, RECORDING MEDIUM, AND IMAGING DEVICE

CROSS-REFERENCE TO RELATED APPLICATIONS

This application is a PCT Bypass continuation application and claims the priority benefit under 35 U.S.C. §120 of PCT Application No. PCT/JP2012/065837 filed on Jun. 21, 2012 which application designates the U.S., and also claims the priority benefits under 35 U.S.C. §119 of Japanese Patent Application No. 2011-215057 filed on Sep. 29, 2011 which applications are all hereby incorporated in their entireties by reference.

BACKGROUND OF THE INVENTION

1. Field of the Invention

The presently disclosed subject matter relates to an image processing device and method, a recording medium, and an imaging device, and more particularly relates to a technology for reducing fixed patterns generated due to repeating cycles of every specified pixel group in an image sensor.

2. Description of the Related Art

FIG. 20 is a view illustrating one example of a color filter array provided for an image sensor. The color filter array illustrated in FIG. 20 is a primary color Bayer array.

The Bayer array includes a basic array pattern of 2×2 pixels, and this basic array pattern is repeatedly arranged in a horizontal direction and a vertical direction. The basic array pattern includes pixels of three primary colors: red (R), blue (B) and green (G) pixels. G pixels include $G_r$ pixel adjacent to R pixel in the horizontal direction and $G_b$ pixel adjacent to B pixel in the horizontal direction.

$G_r$ pixel and $G_b$ pixel are respectively adjacent to pixels which are different in color in the horizontal direction. For example, $G_r$ pixel may have a pixel value larger than the pixel value of a neighboring $G_b$ pixel due to leakage of light (color mixture) from an adjacent R pixel, which may generate a level difference in pixel value between $G_r$ pixel and $G_b$ pixel. This level difference may periodically be repeated in accordance with the basic array pattern, as a result of which a fixed pattern may disadvantageously appear.

SUMMARY OF THE INVENTION

FIG. 21 illustrates a new mosaic-like color filter array proposed by an applicant of the presently disclosed subject matter (The specification of Japanese Patent Application No. 2011-034627).

The basic array pattern of this color filter array is made of 6×6 pixels, and the basic array pattern includes 20 G pixels, 8 R pixels and 8 B pixels. In the case of this basic array pattern, the pixels of the same color are often adjacent to pixels (8 pixels) which are different in color in accordance with positions in the basic array pattern. Accordingly, a fixed pattern is easily generated due to color mixture. Moreover, since the color filter array illustrated in FIG. 21 has the basic array pattern larger in size than the Bayer array, the fixed pattern becomes more notable.

Further, in CMOS (Complementary Metal-Oxide Semiconductor)-type image sensors, amplifiers shared by pixels are embedded in a CMOS substrate. In an example illustrated in FIG. 22, 4 pixels of 2×2 arrangement share one amplifier A. Due to such substrate structure of image sensors, a difference in output level is generated depending on the positions of pixels with respect to the shared amplifier (upper left, upper right, lower left, and lower right positions with respect to the amplifier A), and this generates a fixed pattern corresponding to the repeating cycles of the substrate structure.

As a method for reducing this kind of fixed patterns, it can be considered to perform filtering with use of a filter, which has a filter size of 6×6 pixels and which has weighted filter coefficients by center weighting as illustrated in FIG. 23A. In this case, if the filter is applied while the pixel group in a processing area is shifted, a filter coefficient of 4 is applied, for example, to a G pixel P illustrated in FIG. 23B, though a filter coefficient of 2 is applied to the G pixel P when the filter is moved as illustrated in FIG. 23C. When different filter coefficients are applied in this way in the state where a level difference is present between the G pixel P and G pixels around it, an image after filtering becomes uneven and successful reduction of the fixed pattern cannot be achieved.

Contrary to this, if filtering is performed with use of a filter having uniform filter coefficients as illustrated in FIG. 24, the fixed pattern can be reduced. However, an image is blurred and a detail of the image is lost, which may deteriorate image quality.

Japanese Patent Application Laid-Open No. 2001-148797 discloses an image signal processor capable of performing noise reduction in proportion to an output signal level of a solid-state image sensor so as to reduce noise of the solid-state image sensor without losing necessary components of the image signal. The image signal processor determines the magnitude of the level of image signals generated by the solid-state image sensor and changes the degree of low pass filtering in accordance with the magnitude.

National Publication of International Patent Application No. 2002-520915 discloses a method for descreening a halftone area in an image, in which a low pass filter is modified and applied at the time of descreening the halftone area.

Japanese Patent Application Laid-Open No. 2010-239492 discloses an imaging device in which a filter size of a low pass filter is changed based on a relative distance from an in-focus position so that the filter size monotonously increases in proportion to increase in the relative distance, and thereby the intensity of noise reduction processing performed on video signals is changed.

The invention disclosed in Japanese Patent Application Laid-Open No. 2001-148797 is to reduce light shot noise depending on an output signal level of the solid-state image sensor. Accordingly, the invention disclosed in Japanese Patent Application Laid-Open No. 2001-148797 is not effective for reducing fixed patterns, and strong fixed patterns end up remaining.

The inventions disclosed in National Publication of International Patent Application No. 2002-520915 and Japanese Patent Application Laid-Open No. 2010-239492 are not adapted to reduce fixed patterns. A filter correction method disclosed in National Publication of International Patent Application No. 2002-520915 and a filter size changing method disclosed in Japanese Patent Application Laid-Open No. 2010-239492 are not adapted to reduce fixed patterns either.

The presently disclosed subject matter has been made based on such circumstances, and an object of the presently disclosed subject matter is to provide an image processing device and method, a recording medium, and an imaging device capable of reducing fixed patterns generated due to repeating cycles of pixel configuration in an image sensor and capable of leaving a detail intact.

In order to accomplish the above object, an image processing device according to one aspect of the presently disclosed subject matter includes: an image acquisition device configured to acquire an image taken by an imaging device including an image sensor having pixel configuration with repeating cycles of M×N (M, N: integers of 2 or more) pixels; and a filtering device having a filter with a K×L (K, L: integers of M<K and N<L) filter size, the filtering device configured to apply convolution arithmetic operation to filter coefficients set for the filter and pixel values of K×L pixels extracted based on a target pixel in the image acquired by the image acquisition device so as to calculate a pixel value of the target pixel, wherein the filter coefficients set for the filter are weighted to be larger in a vicinity of a center of the filter, and the filter coefficients are set so that sums of the filter coefficients in the filter size, which filter coefficients correspond to pixels that are in identical positional relationship on the pixel configuration of M×N pixels, are all equal to each other.

Since the filter coefficients of the filter have filter coefficients weighted to be larger in the vicinity of the center, it becomes possible to prevent losing of a detail of the image after filtering by the filtering device. Further, for the pixel configuration with the repeating cycles of M×N pixels in the image sensor, there is used a filter with the K×L filter size which is one size larger than the pixel configuration. It is so set that the sums of the filter coefficients in the filter size, which filter coefficients correspond to pixels that are in the identical positional relationship on the pixel configuration made of M×N pixels, are all equal to each other. Accordingly, substantial data smoothing is performed on the pixel values of the M×N pixels. This makes it possible to reduce a fixed pattern generated due to the pixel configuration with the repeating cycles of M×N pixels.

In an image processing device according to another aspect of the presently disclosed subject matter, the image sensor is a color image sensor in which a specified basic array pattern including color filters of three colors is arranged in a repeated manner in a horizontal direction and a vertical direction on a plurality of pixels arrayed in the horizontal direction and the vertical direction, and the pixel configuration with the repeating cycles of M×N pixels corresponds to the specified basic array pattern. That is, although a fixed pattern is generated in the image outputted from the image sensor due to cycles of the pixel configuration (repetition of a specified pixel group) in the image sensor, the pixel configuration corresponds to the specified basic array pattern including color filters of three colors.

In an image processing device according to still another aspect of the presently disclosed subject matter, the image sensor is an image sensor having sensor configuration in which an amplifier is shared for every specified pixel group, and the pixel configuration with the repeating cycles of M×N pixels corresponds to the specified pixel groups. That is, although a fixed pattern is generated in the image outputted from the image sensor due to cycles of the pixel configuration in the image sensor, the pixel configuration corresponds to substrate configuration including each shared amplifier of the image sensor.

In an image processing device according to still another aspect of the presently disclosed subject matter, the image sensor is a color image sensor having sensor configuration in which a specified basic array pattern including color filters of three colors is arranged in a repeated manner in a horizontal direction and a vertical direction on a plurality of pixels arrayed in the horizontal direction and the vertical direction and an amplifier is shared for every specified pixel group, and the repeating cycles of M×N pixels in the pixel configuration are cycles of a least common multiple of the specified basic array pattern and the specified pixel group.

In an image processing device according to still another aspect of the presently disclosed subject matter, the basic array pattern includes color filters of three primary colors which are red (R), green (G) and blue (B), and the basic array pattern is a square array pattern corresponding to N×N (N: an integer of 3 or more) pixels. Since the basic array pattern includes at least 9 pixels and a plurality of pixels of the same color are present, a fixed pattern is easily generated. The presently disclosed subject matter is more effective for the images obtained from the image sensor having such a basic array pattern.

In an image processing device according to still another aspect of the presently disclosed subject matter, the filtering device applies convolution arithmetic operation to a target pixel among K×L pixels in an area to be processed with the filter, pixel values of pixels corresponding to a color filter, a color of which is identical to a color filter of the target pixel, and filter coefficients of the filter corresponding to these pixels so as to calculate a pixel value of the target pixel.

An image processing device according to still another aspect of the presently disclosed subject matter further includes: a fixed pattern size acquisition device configured to acquire a fixed pattern size corresponding to M×N pixels that represent repeating cycles of the pixel configuration in the image sensor; and a filter coefficient calculation device having filter coefficients weighted to be larger in the vicinity of the center of the filter based on the acquired fixed pattern size, the filter coefficient calculation device being configured to calculate the filter coefficients so that sums of the filter coefficients in the filter size, which filter coefficients correspond to pixels that are in identical positional relationship on the sensor configuration of M×N pixels, are all equal to each other, wherein the filtering device acquires the filter coefficients calculated by the filter coefficient calculation device. According to the foregoing, if a fixed pattern size can be obtained, the filter coefficients that can reduce the fixed pattern can be calculated.

In an image processing device according to still another aspect of the presently disclosed subject matter, the image sensor is a color image sensor in which a specified basic array pattern including color filters of three colors is arranged in a repeated manner in a horizontal direction and a vertical direction on a plurality of pixels arrayed in the horizontal direction and the vertical direction, and the fixed pattern size acquisition device acquires a size of the specified basic array pattern as the fixed pattern size.

In an image processing device according to still another aspect of the presently disclosed subject matter, the image sensor is an image sensor having sensor configuration in which an amplifier is shared for every specified pixel group, and the fixed pattern size acquisition device acquires, as the fixed pattern size, an image size of the specified pixel group that shares the amplifier.

In an image processing device according to still another aspect of the presently disclosed subject matter, the image sensor is a color image sensor having sensor configuration in which a specified basic array pattern including color filters of three colors is arranged in a repeated manner in a horizontal direction and a vertical direction on a plurality of pixels arrayed in the horizontal direction and the vertical direction and an amplifier is shared for every specified pixel group, and the fixed pattern size acquisition device acquires, as the fixed pattern size, a size that is a least common multiple of the size of the specified basic array pattern and the image size of the specified pixel group that shares the amplifier.

More specifically, the fixed pattern size can be acquired as the size of the basic array pattern of the color filters of three colors in the image sensor, the image size of each pixel group that uses one shared amplifier on the substrate of the image sensor, or the size of the least common multiple of these sizes.

An image processing device according to still another aspect of the presently disclosed subject matter further includes a filter size calculation device configured to calculate the K×L filter size based on the fixed pattern size of M×N, wherein the filter coefficient calculation device calculates filter coefficients corresponding to the filter size calculated by the filter size calculation device.

A method for image processing according to still another aspect of the presently disclosed subject matter includes: a step of acquiring an image taken by an imaging device including an image sensor having pixel configuration with repeating cycles of M×N (M, N: integers of 2 or more) pixels; (a) a step of setting a target pixel in the acquired image and extracting K×L (K, L: integers of M<K and N<L) pixels based on the target pixel; (b) a step of having a filter of a K×L filter size and applying convolution arithmetic operation to filter coefficients set for the filter and pixel values of the extracted K×L pixels so as to calculate a pixel value of the target pixel; and (c) a step of repeatedly executing the step (a) and the step (b) while moving the target pixel one pixel at a time with respect to the acquired image, wherein the filter coefficients set for the filter are weighted to be larger in a vicinity of a center of the filter, and the filter coefficients are so set that sums of the filter coefficients in the filter size, which filter coefficients correspond to pixels that are in identical positional relationship on the sensor configuration of M×N pixels, are all equal to each other.

According to still another aspect of the presently disclosed subject matter, an image processing program for making a computer execute: a function of acquiring an image taken by an imaging device including an image sensor having pixel configuration with repeating cycles of M×N (M, N: integers of 2 or more) pixels; (a) a function of setting a target pixel in the acquired image and extracting K×L (K, L: integers of M<K and N<L) pixels based on the target pixel; (b) a function of having a filter of a K×L filter size and applying convolution arithmetic operation to filter coefficients set for the filter and pixel values of the extracted K×L pixels so as to calculate a pixel value of the target pixel; and (c) a function of repeatedly executing the function (a) and the function (b) while moving the target pixel one pixel at a time with respect to the acquired image, wherein the filter coefficients set for the filter are weighted to be larger in a vicinity of a center of the filter, and the filter coefficients are set so that sums of the filter coefficients in the filter size, which filter coefficients correspond to pixels that are in identical positional relationship on the sensor configuration of M×N pixels, are all equal to each other.

An imaging device according to still another aspect of the presently disclosed subject matter includes: an imaging device including a photographing optical system and an image sensor configured to form a subject image via the photographing optical system; the image acquisition device configured to acquire an image outputted from the imaging device; and the image processing device according to any one of the above-mentioned aspects.

According to the presently disclosed subject matter, there is used a filter with the filter size of K×L (K, L: integers of M<K and N<L) which is one size larger than pixel configuration with repeating cycles of M×N pixels included in the image sensor, filter coefficients for the filter are weighted to be larger in the vicinity of the center, and the filter coefficients are so set that respective sums of the filter coefficients in the filter size, corresponding to pixels that are in identical positional relationship on the sensor configuration made of M×N pixels, are all equal to each other. This makes it possible to prevent losing of a detail of an image after filtering with use of the filter. Further, it becomes possible to reduce a fixed pattern generated due to the pixel configuration with the repeating cycles of M×N pixels.

BRIEF DESCRIPTION OF THE DRAWINGS

FIG. 1A is a view illustrating one example of a mosaic-like color filter array arranged on an image sensor;

FIG. 1B is a view illustrating one example of filter coefficients for a fixed pattern reduction filter corresponding to the color filter array of FIG. 1A;

FIG. 4A is a view for explaining configuration of the filter coefficients illustrated in FIG. 3;

FIG. 4B is a view for explaining configuration of the filter coefficients illustrated in FIG. 3;

FIG. 4C is a view for explaining configuration of the filter coefficients illustrated in FIG. 3;

FIG. 5 is a block diagram illustrating a first embodiment of an imaging device according to the presently disclosed subject matter;

FIG. 6 is a flow chart illustrating a first embodiment of a method for image processing in the imaging device illustrated in FIG. 5;

FIG. 9 is a flow chart illustrating a second embodiment of the method for image processing in the imaging device illustrated in FIG. 7;

FIG. 10 is a block diagram illustrating a third embodiment of the imaging device according to the presently disclosed subject matter;

FIG. 23A is a view illustrating a filter having center-weighted filter coefficients;

FIG. 23B is a view illustrating an application example of a filter having center-weighted filter coefficients;

FIG. 23C is a view illustrating an application example of a filter having center-weighted filter coefficients; and FIG. 24 is a view illustrating a filter having uniform filter coefficients.

DETAILED DESCRIPTION OF EXEMPLARY EMBODIMENTS

Hereinafter, a detailed description is given of preferred embodiments of an image processing device and method, a recording medium, and an imaging device according to the presently disclosed subject matter with reference to the accompanying drawings.

Method for Reducing Fixed Pattern

First Embodiment

FIG. 1A illustrates one example of a mosaic-like color filter array arranged on each of photoelectric conversion elements of an image sensor on which the photoelectric conversion elements are arrayed two-dimensionally.

The color filter array illustrated in FIG. 1A includes a basic array pattern (pattern illustrated with a thick frame) which is a square array pattern corresponding to 6×6 pixels. This basic array pattern is arranged repeatedly in a horizontal direction and a vertical direction. That is, the color filter array is arranged so that filters of respective R, G, and B colors (R filter, G filter and B filter) are arranged in the horizontal direction and the vertical direction with cyclicity corresponding to the basic array pattern (6×6 pixels).

The basic array pattern illustrated in FIG. 1A may also be construed as an arrangement made of an "a" array of 3×3 pixels and a "b" array of 3×3 pixels placed alternately in the horizontal direction and the vertical direction.

In each of the "a" array and the "b" array, G filters which are luminance pixels are arranged at four corners and at the center, so that they are arranged on both the diagonal lines. In the "a" array, R filters are arrayed in the horizontal direction and B filters are arrayed in the vertical direction, across the central G filter. Contrary to this, in the "b" array, B filters are arrayed in the horizontal direction and R filters are arrayed in the vertical direction, across the central G filter. In other words, in the "a" array and the "b" array, positional relationship of R filters and B filters are reversed, though other arrangement features are identical.

In an RGB mosaic image outputted from the image sensor (color image sensor) having the color filter array, a fixed pattern corresponding to repeating cycles of the basic array pattern is generated.

FIG. 1B illustrates filter coefficients of a filter for reducing the fixed pattern.

The filter illustrated in FIG. 1B has a 9×9 filter size which is larger than the basic array pattern (fixed pattern). When the filter size is divided into nine, 3×3 areas, filter coefficients assigned to each of the areas are set so that a filter coefficient of a central area is 4, a filter coefficient of areas on the upper, lower, left and right sides thereof is 2, and a filter coefficient of four corner areas is 1. More specifically, the filter coefficients are weighted to be larger in the vicinity of the center of the filter (pixels closer to the central section of the filter are set to have larger filter coefficients).

Figure 2A:
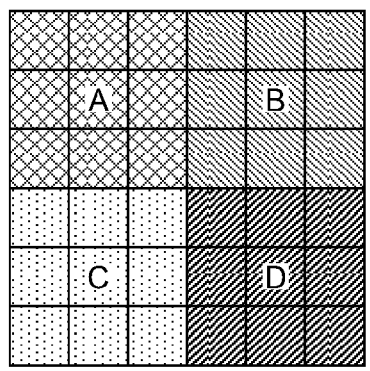
FIG. 2A is a view for explaining configuration of the filter coefficients illustrated in FIG. 1B.
Figure 2B:
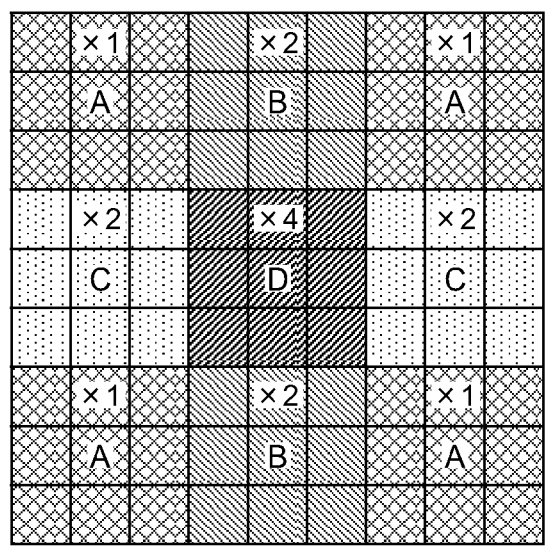
FIG. 2B is a view for explaining configuration of the filter coefficients illustrated in FIG. 1B.

Further, as illustrated in FIG. 2A, when the basic array pattern of 6×6 pixels is divided into four, 3×3 areas, and the respective areas are defined as A, B, C, and D, relation between the respective areas A to D and the respective areas obtained by a 9×9 filter divided into nine areas are as illustrated in FIG. 2B.

More specifically, when the area D of the basic array pattern corresponds to the area of the central section of the filter which was divided into nine areas, the areas B of the basic array pattern correspond to the areas on the upper and lower side of the central area. And the areas C of the basic array pattern correspond to the areas on the left and right side of the central section. The areas A of the basic array pattern correspond to the areas of four corners.

In this case, the number of each of the areas A, B, C and D on the filter is 4:2:2:1. Meanwhile, the filter coefficient in each of the areas A, B, C and D is 1:2:2:4. That is, the sums of the filter coefficients corresponding to the respective areas A, B, C and D are 4×1=4, 2×2=4, 2×2=4, and 1×4=4, which are all equal to each other.

Accordingly, when convolution arithmetic operation is applied to the filter coefficients of the filter and pixel values of the mosaic image corresponding to the color filter array, uniform filter coefficients are applied to the respective areas A, B, C and D of the basic array pattern, so that the areas are smoothed. It becomes possible to reduce the fixed pattern resulting from repeating cycles of the basic array pattern.

Further, since the filter coefficients in the 9×9 filter are weighted to be larger in the vicinity of the center as illustrated in FIG. 1B, it becomes possible to prevent losing of a detail of the filtered image.

Second Embodiment

Figure 3:
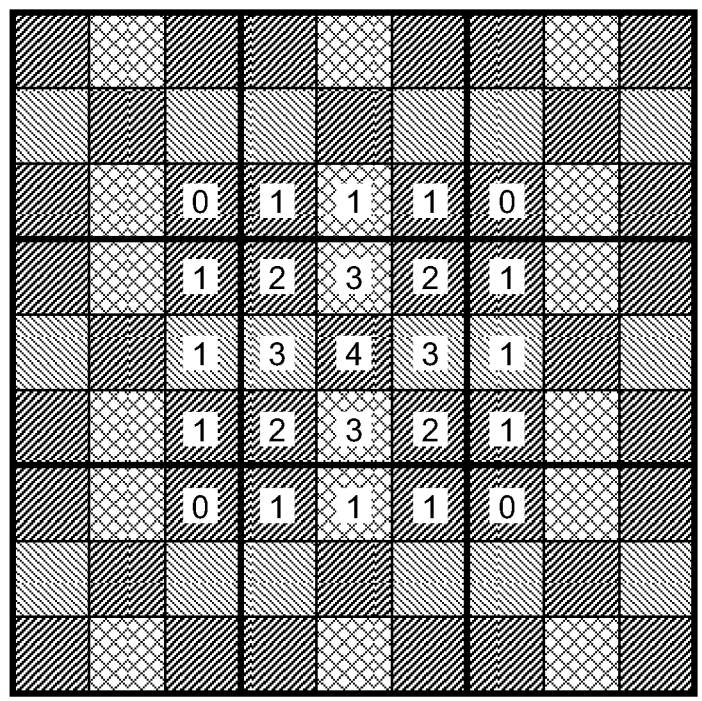
FIG. 3 is a view illustrating another example of the mosaic-like color filter array arranged on the image sensor and one example of filter coefficients for a fixed pattern reduction filter corresponding to the color filter array.

FIG. 3 is a view illustrating another example of the mosaic-like color filter array arranged on the image sensor and one example of filter coefficients for a fixed pattern reduction filter corresponding to the color filter array.

The color filter array illustrated in FIG. 3 includes a basic array pattern made of a square array pattern corresponding to 3×3 pixels, and the basic array pattern is repeatedly arranged in the horizontal direction and the vertical direction. Note that the basic array pattern illustrated in FIG. 3 corresponds to the "a" array of 3×3 pixels illustrated in FIG. 1A.

In contrast, the filter for reducing a fixed pattern has a 5×5 filter size. Moreover, the filter has filter coefficients weighted to be larger in the vicinity of the center and is so set that the sums of filter coefficients in the 5×5 filter size, corresponding to the pixels that are in identical positional relationship on the basic array pattern of 3×3 pixels, are all equal to each other.

FIG. 4A illustrates the filter coefficients of the 5×5 filter.

As illustrated in FIG. 4B, a pair of a column $j_1$ and a column $j_4$ and a pair of a column $j_2$ and a column $j_5$ on this filter are in identical positional relationship on the basic array pattern. By adding up filter coefficients allocated to these columns, filter coefficients as seen in a column $(j_1+j_4)$ and a column $(j_2+j_5)$ illustrated on the right side of FIG. 4B can be obtained.

A pair of a row $i_1$ and a row $i_4$ and a pair of a row $i_2$ and a row $i_5$ on this filter are also in identical positional relationship on the basic array pattern. By adding up the filter coefficients allocated to these rows (rows of the added filter coefficients on the right-hand side of FIG. 4B), the filter coefficients as seen in a row $(i_1+i_4)$ and a row $(i_2+i_5)$ illustrated on the right side of FIG. 4C can be obtained.

The filter coefficients corresponding to each of the positions on the basic array pattern obtained by adding up the filter coefficients of the 5×5 filter according to the above procedures as described in the foregoing are all equal to 4.

For example, the rows of the filter are defined as $i_m$, $i_{(m-1)}, \ldots, i_1, i_0$ (one or more rows which are positioned in the central section of the filter and which are identical in arrangement of filter coefficients), $i_{-1}, \ldots, i_{-(m-1)}, i_{-m}$, while the columns are defined as $j_n, j_{(n-1)}, \ldots, j_1, j_0$ (one or more columns which are positioned in the central section of the filter and which are identical in arrangement of filter coefficients), $j_{-1}, j_{-(n-1)}, j_{-n}$. In this filter, the filter coefficients of the columns which are in specified positional relationship across the central column $j_0$ are added to obtained $(j_n+j_{-1})$, $(j_{(n-1)}+j_{-2})$, $(j_1+j_{-n})$. Then, the filter coefficients of the rows which are in specified positional relationship across the central row $i_0$ are added to obtain $(i_m+i_{-1})$, $(i_{(m-1)}+i_{-2})$, ..., $(i_1+i_{-m})$. The values of the filter coefficients of (m+(the number of $i_0$ rows))×(n+(the number of $j_0$ columns)) obtained by the aforementioned addition are all equal to each other. Note that when m and n are odd numbers, the values of the filter coefficients obtained by addition of $(j_{(n+1)/2}+j_{(n+1)/2})$ and addition of $(i_{(m+1)/2}+i_{(m+1)/2}$ are also all equal to the above filter coefficients.

By performing filtering with use of the filter, a fixed pattern resulting from repeating cycles of the basic array pattern of 3×3 pixels can be reduced. Further, since the filter coefficients weighted to be larger in the vicinity of the center are assigned, it becomes possible to prevent losing of a detail of the filtered image.

First Embodiment of Imaging Device

FIG. 5 is a block diagram illustrating a first embodiment of an imaging device according to the presently disclosed subject matter.

An imaging device 10-1 illustrated in FIG. 5 is configured to record a taken image on a recording medium 12 such as a memory card. Operation of the entire imaging device 10-1 is controlled by a central processing unit (CPU) 14 in an integrated manner.

The CPU 14 controls each unit of the imaging device 10-1 based on input signals from operation units such as a shutter button and a power button which are not illustrated. The CPU 14 performs, for example, drive control of lenses, photographing operation control, image processing control, record/reproduction control of image data, display control of a liquid crystal monitor, and the like in response to input signals from the operation units.

Subject light which has passed through a photographic lens 16 forms an image on a light receiving surface of an image sensor 18. A subject image formed on the image sensor 18 is converted, with photoelectric conversion elements, into a signal charge corresponding to an incident light amount. An image acquisition unit 20 reads signal charges, which are accumulated in each of the photoelectric conversion elements of the image sensor 18, one by one by from the image sensor 18 as voltage signals (image signals) and outputs them to a filtering unit 22. The image signals outputted from the image acquisition unit 20 to the filtering unit 22 are R, G, and B signals (digital signals) indicating R, G and B mosaic images corresponding to the color filter array of the image sensor 18.

Note that the image sensor 18 is not limited to a CCD (charge coupled device) image sensor but may be an image sensor of other types such as a CMOS (complementary metal-oxide semiconductor) image sensor.

The filtering unit 22 has filter coefficients of a K×L filter size imparted from a filter coefficient calculation unit 26. The filtering unit 22 applies convolution arithmetic operation to pixel values of K×L pixels extracted based on a target pixel to be filtered in the image acquired from the image acquisition unit 20 and filter coefficients of the K×L filter size so as to calculate a pixel value of the target pixel.

A fixed pattern size acquisition unit 24 acquires a fixed pattern size corresponding to the repeating cycles of the pixel configuration in the image sensor 18, and outputs size information indicating the fixed pattern size to the filter coefficient calculation unit 26. Note that as the size information indicating the fixed pattern size, a size preset in accordance with the type of the image sensor 18 is inputted. For example, in the case of an image sensor having a color filter array including the basic array pattern illustrated in FIG. 1B, a 6×6 fixed pattern size is inputted. In the case of an image sensor having a color filter array including the 3×3 basic array pattern illustrated in FIG. 3, a 3×3 fixed pattern size is inputted.

The filter coefficient calculation unit 26 calculates filter coefficients of a filter size, which is larger than the fixed pattern size, based on the size information indicating the fixed pattern size inputted from the fixed pattern size acquisition unit 24.

For example, when the fixed pattern size is M×N (M, N: integers of 2 or more) pixels, the filter coefficient calculation unit 26 calculates filter coefficients corresponding to the filter size of K×L (K, L: integers of M<K and N<L). As explained in FIGS. 1A to 4C, the filter coefficient calculation unit 26 has filter coefficients weighted to be larger in the vicinity of the center, and calculates the filter coefficients so that sums of the filter coefficients in the filter size, corresponding to pixels that are in identical positional relationship on the fixed pattern, are all equal to each other.

A piece of mosaic image data (RAW data) for one screen which was processed to reduce the fixed pattern by the filtering unit 22 is inputted into a memory (SDRAM; synchronous dynamic random access memory) 28 and is temporarily stored therein.

The piece of image data temporarily stored in the memory 28 is appropriately read by a digital signal processing unit (not illustrated). The piece of read image data is subjected to white balance correction, gamma correction, synchronization processing (processing to calculate all of RGB color information from every pixel of the RGB mosaic images relating to the color filter array of the single-plate type color image sensor 18 (to convert the information to simultaneous information), which is also referred to as demosaicing)), YC processing to generate luminance signals Y and color-difference signals Cr and Cb, contour correction, color correction, and the like. After the above-stated processings are performed, the image data is compression-processed in conformity with JPEG (Joint Photographic Experts Group) standard and is recorded on the recording medium 12. Or alternatively, the image data is outputted and displayed on an liquid crystal monitor which is not illustrated.

First Embodiment of Method for Image Processing

FIG. 6 is a flow chart illustrating a first embodiment of a method for image processing in the imaging device 10-1 described above.

In FIG. 6, when a photographing instruction is inputted by operation of the shutter button, the image acquisition unit 20 acquires a mosaic image corresponding to the color filter array in the image sensor 18 via the photographic lens 16 and the image sensor 18 (step S10).

Meanwhile, the fixed pattern size acquisition unit 24 acquires a fixed pattern size (M×N) (M, N: integers of 2 or more) corresponding to the repeating cycles of the pixel configuration in the image sensor 18 (step S12), and outputs size information indicating the fixed pattern size (M×N) to the filter coefficient calculation unit 26. Based on size information of the fixed pattern size (M×N) inputted from the fixed pattern size acquisition unit 24, the filter coefficient calculation unit 26 calculates filter coefficients of a filter size (K×L) (K, L: integers of M<K and N<L) which is larger than the fixed pattern size (step S14). Note that it is preferable to calculate and store filter coefficients in advance and to use the stored filter coefficients.

The filter size (K×L) is set to be a proper size that is larger than the fixed pattern size (M×N). If the filter size is too large, blurring of the filtered image is increased. Accordingly, it is preferable to prescribe an upper limit of the filter size (K×L) with respect to the fixed pattern size (M×N) as in the following Formulas (1) and (2).

$$M<K<M+10, N<L<N+10 \quad (1)$$

$$M<K<M\times2.5, N<L<N\times2.5 \quad (2)$$

Next, the filtering unit 22 performs filtering based on the mosaic image acquired in step S10 and the filter coefficients calculated in step S14 (step S16).

More specifically, a target pixel (x, y) is set inside the acquired image, and K×L pixels are extracted based on the target pixel (x, y). Convolution arithmetic operation (product sum operation) is then applied to the extracted K×L pixels and filter coefficients of the K×L filter size so as to calculate the pixel value of the target pixel (x, y). Herein, when the target pixel (x, y) has a color of G pixel, convolution arithmetic operation is performed with use of G pixels among mosaic pixels of the K×L pixels and the filter coefficients corresponding to the positions of the G pixels. Similarly, when the target pixel is an R pixel or a B pixel, convolution arithmetic operation is performed with use of the pixels of the same color and the filter coefficients corresponding to the positions of the pixels. Thus, the pixel value after filtering is calculated.

When the image size of the acquired mosaic image is W×H pixels, the filtering is repeatedly performed while the position of the target pixel (x, y) is moved one pixel at a time in the range of 1≤x≤W and 1≤y≤H. Thus, filtering of all the pixels of the mosaic image is performed.

The mosaic image subjected to filtering for reducing the fixed pattern as described in the foregoing is then subjected to general digital signal processing, such as white balance correction, gamma correction, synchronization processing, and YC processing (step S18). Luminance signals Y and color-difference signals subjected to YC processing are compression-processed and are then recorded on the recording medium 12 (step S20).

Second Embodiment of Imaging Device

Figure 7:
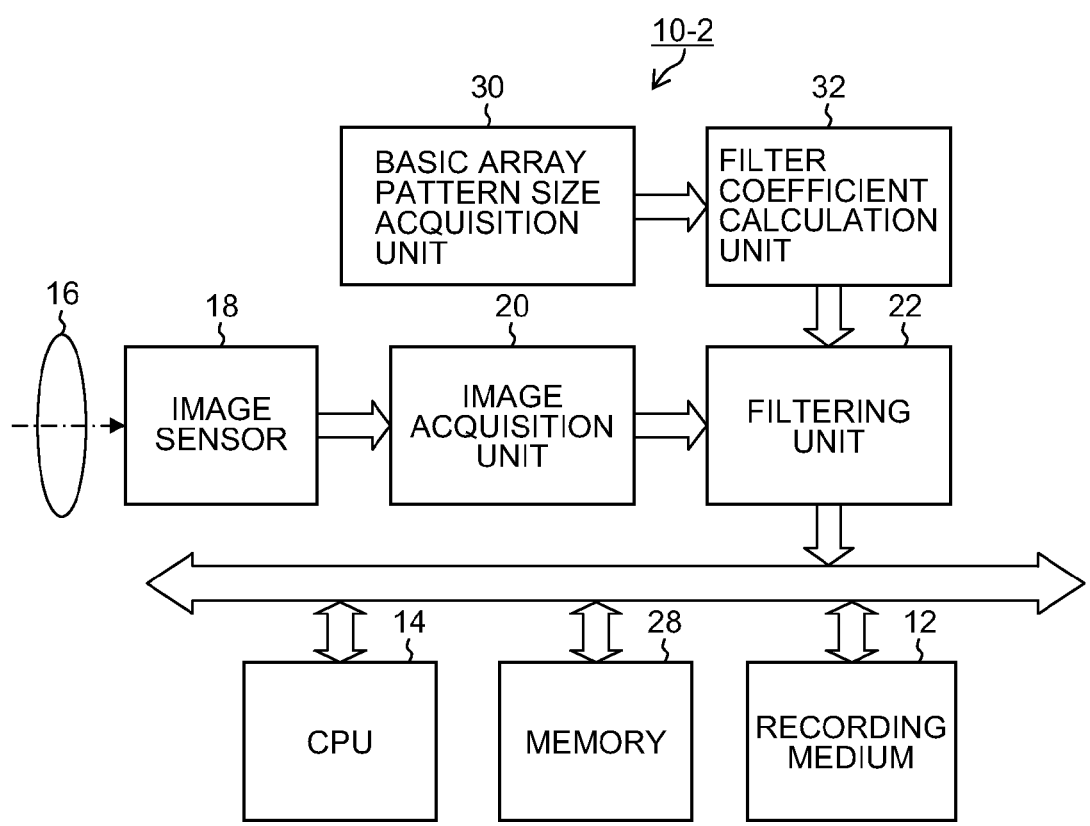
FIG. 7 is a block diagram illustrating a second embodiment of the imaging device according to the presently disclosed subject matter.

FIG. 7 is a block diagram illustrating a second embodiment of the imaging device according to the presently disclosed subject matter. It is to be noted that component members identical to those of the first embodiment illustrated in FIG. 5 are designated by identical reference numerals to omit detailed description.

An imaging device 10-2 of the second embodiment illustrated in FIG. 7 is different in the point that the fixed pattern size acquisition unit 24 and the filter coefficient calculation unit 26 of the first embodiment are replaced with a basic array pattern size acquisition unit 30 and a filter coefficient calculation unit 32.

The basic arrangement pattern size acquisition unit 30 acquires the size (basic array pattern size) of the basic array pattern of RGB filters in the mosaic-like color filter array provided in the image sensor 18.

Figure 8:
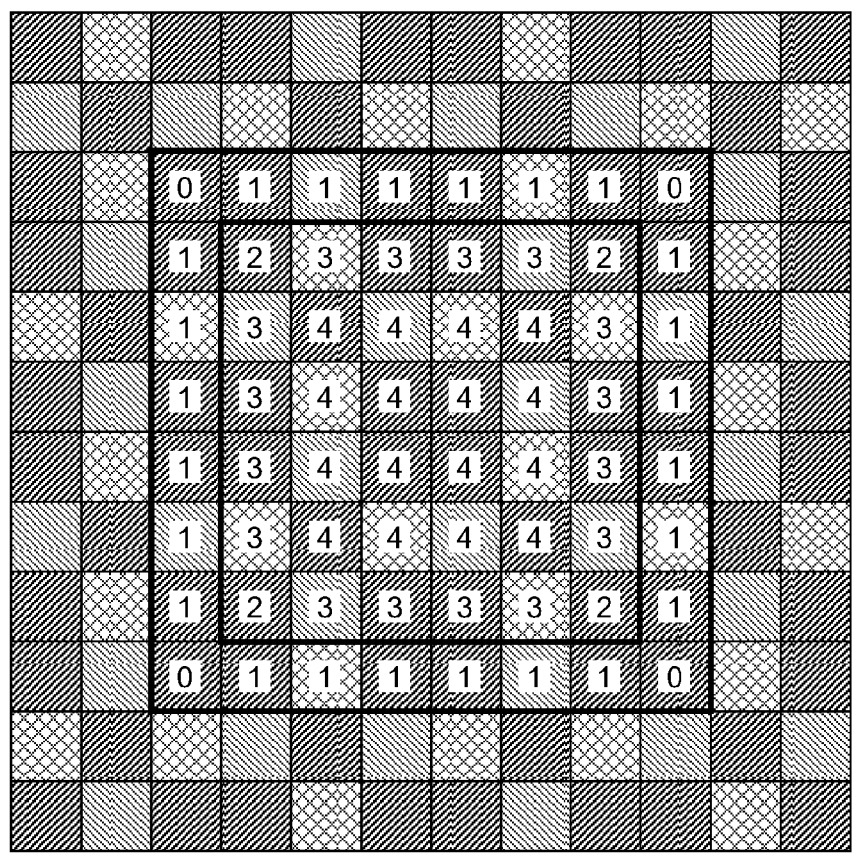
FIG. 8 is a view illustrating still another example of the mosaic-like color filter array arranged on the image sensor and one example of filter coefficients for a fixed pattern reduction filter corresponding to the color filter array.

For example, in the case of a color filter array illustrated in FIG. 8, a basic array pattern illustrated with an inner thick frame, which is a minimum repeating pattern of the RGB filters in the horizontal direction and the vertical direction, is made of 6×6 pixels. Therefore, the basic array pattern size of the color filter array illustrated in FIG. 8 is 6×6 pixels.

Regarding the pixels of the same color in the basic array pattern, color combination of their respective adjacent pixels (8 pixels) are different from each other in accordance with their positions in the basic array pattern. Accordingly, even when a local area of a subject has uniform color and luminance, a level difference is generated in output signals due to color mixture between adjacent pixels. The level difference in the output signals is repeated with the cycles of the basic array pattern and appears as a fixed pattern. Therefore, the basic array pattern size is in common with the fixed pattern size.

The basic array pattern size acquisition unit 30 acquires the basic array pattern size, and outputs size information indicating the basic array pattern size to the filter coefficient calculation unit 32. Note that as the size information indicating the basic array pattern size, a size preset in accordance with the basic array pattern of the image sensor 18 is inputted.

Based on size information of the basic array pattern size inputted from the basic array pattern size acquisition unit 30, the filter coefficient calculation unit 32 calculates filter coefficients of a filter size larger than the basic array pattern size, and imparts the calculated filter coefficients to the filtering unit 22.

In an example illustrated in FIG. 8, the filter coefficient calculation unit 32 calculates filter coefficients of the 8×8 filter size. Moreover, the filter coefficients are set so that filter coefficients weighted to be larger in the vicinity of the center are assigned and that the sums of the filter coefficients in the 8×8 filter size, corresponding to the pixels that are in identical positional relationship on the basic array pattern made of 6×6 pixels, are all equal to each other.

By filtering in the filtering unit 22 with use of the filter coefficients calculated by the filter coefficient calculation unit 32, it becomes possible to reduce the fixed pattern while preventing losing of a detail of the filtered image.

Second Embodiment of Method for Image Processing

FIG. 9 is a flow chart illustrating a second embodiment of the method for image processing in the imaging device 10-2. It is to be noted that the steps of the method for image processing identical to those of the first embodiment illustrated in FIG. 6 are designated by identical step numbers to omit detailed description.

The second embodiment illustrated in FIG. 9 is different from the first embodiment in the point that processing of steps S30 and S32 is performed instead of steps S12 and S14 of the first embodiment illustrated in FIG. 6.

More specifically, in step S30, a basic pattern size (M×N) (M, N: integers of 2 or more) of the color filter array in the image sensor 18 is acquired. In step S32, the basic pattern size (M×N) acquired in step S30 is defined as a fixed pattern size (M×N), and filter coefficients of a filter size (K×L) (K, L: integers of M<K and N<L) larger than the fixed pattern size are calculated. The filter coefficients of the filter size (K×L) are calculated so that filter coefficients weighted to be larger in the vicinity of the center are assigned and that the sums of the filter coefficients in the K×L filter size, corresponding to the pixels that are in identical positional relationship on the basic array pattern of M×N pixels, are calculated to be all equal to each other.

Third Embodiment of Imaging Device

FIG. 10 is a block diagram illustrating a third embodiment of the imaging device according to the presently disclosed subject matter. It is to be noted that component members identical to those of the first embodiment illustrated in FIG. 5 are designated by identical reference numerals to omit detailed description.

An imaging device 10-3 of the third embodiment illustrated in FIG. 10 is different in the point that the fixed pattern size acquisition unit 24 and the filter coefficient calculation unit 26 of the first embodiment are replaced with a size-of-pixel-sharing-amplifier acquisition unit 40 and a filter coefficient calculation unit 42.

The size-of-pixel-sharing-amplifier acquisition unit 40 acquires a size of pixels sharing an amplifier embedded in the substrate of the image sensor 18. In a CMOS type image sensor illustrated in FIG. 11A, the pixel sharing amplifiers are embedded in a CMOS substrate. In an example illustrated in FIG. 11A, 4 pixels of 2×2 arrangement share one amplifier A, and so the size of pixels sharing the amplifier is 2×2. Due to such substrate configuration of the image sensor, a difference in output level is generated depending on the positions of pixels with respect to the amplifier A (upper left, upper right, lower left, and lower right positions with respect to the amplifier A), and this generates a fixed pattern corresponding to the repeating cycles of the substrate configuration.

The size-of-pixel-sharing-amplifier acquisition unit 40 acquires the size of pixels sharing the amplifier, and outputs size information indicating the size of pixels sharing the amplifier to the filter coefficient calculation unit 42. Note that as the size information indicating the size of pixels sharing the amplifier, a size preset in accordance with the size of pixels sharing the amplifier of the image sensor 18 is inputted.

Based on the size information of the size of pixels sharing the amplifier inputted from the size-of-pixel-sharing-amplifier acquisition unit 40, the filter coefficient calculation unit 42 calculates filter coefficients of a filter size larger than the size of pixels sharing the amplifier, and imparts the calculated filter coefficients to the filtering unit 22.

Figures 11A, 11B:
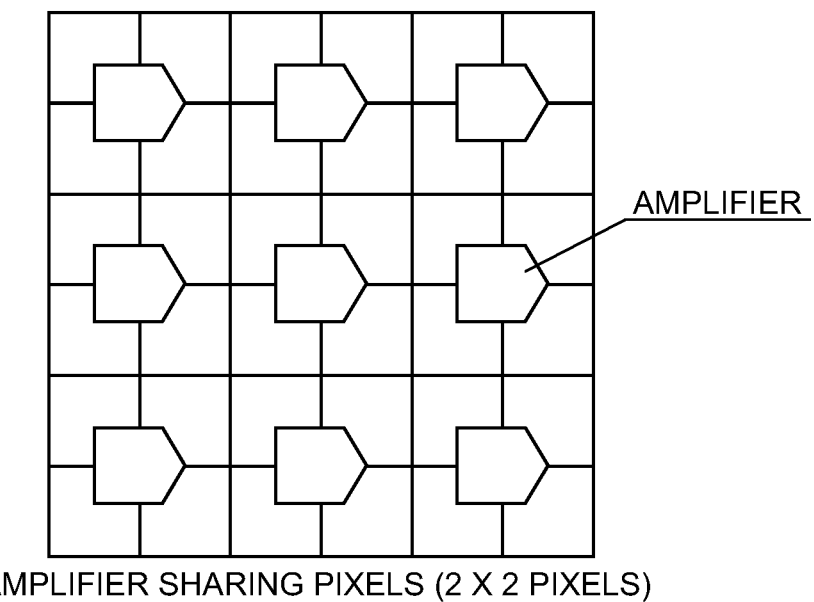
FIG. 11A is a view illustrating an example of a size of pixels sharing an amplifier of the image sensor.
FIG. 11B is a view illustrating one example of filter coefficients for a fixed pattern reduction filter corresponding to the size of pixels sharing the amplifier illustrated in FIG. 11A.

In an example illustrated in FIG. 11B, filter coefficients of a 4×4 filter size are calculated for the a size of pixels sharing an amplifier which is 2×2 illustrated in FIG. 11A. Moreover, the filter coefficients are set so that filter coefficients weighted to be larger in the vicinity of the center are assigned and that the sums of the filter coefficients in the 4×4 filter size, corresponding to the pixels that are in identical positional relationship on the size-of-pixel-sharing-amplifier of 2×2 pixels, are all equal to each other.

By filtering in the filtering unit 22 with use of the filter coefficients calculated by the filter coefficient calculation unit 42, the fixed pattern corresponding to the size of pixels sharing the amplifier can be reduced. Further, it becomes possible to prevent losing of a detail of the filtered image.

Third Embodiment of Method for Image Processing

Figure 12:
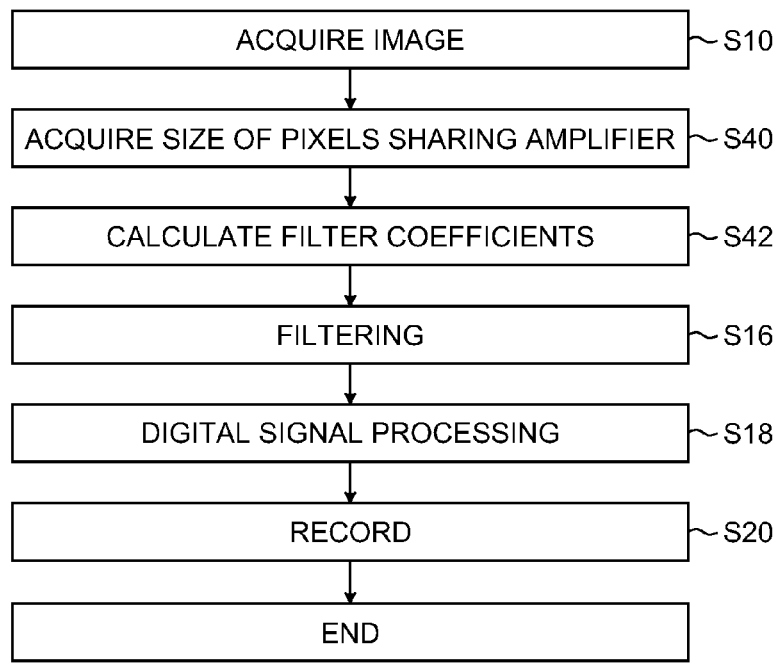
FIG. 12 is a flow chart illustrating a third embodiment of the method for image processing in the imaging device illustrated in FIG. 10.

FIG. 12 is a flow chart illustrating a third embodiment of the method for image processing in the imaging device 10-3. It is to be noted that the steps of the method for image processing identical to those of the first embodiment of the method for image processing illustrated in FIG. 6 are designated by identical step numbers to omit detailed description.

The third embodiment illustrated in FIG. 12 is different from the first embodiment in the point that processing of steps S40 and S42 is performed instead of steps S12 and S14 of the first embodiment illustrated in FIG. 6.

More specifically, in step S40, a size-of-pixel-sharing-amplifier (M×N) (M, N: integers of 2 or more) of the image sensor 18 is acquired. In step S42, the basic pattern size (M×N) acquired in step S40 is defined as a fixed pattern size (M×N), and filter coefficients of a filter size (K×L) (K, L: integers of M<K and N<L) larger than the fixed pattern size are calculated. The filter coefficients of the filter size (K×L) are calculated so that filter coefficients weighted to be larger in the vicinity of the center are assigned and that the sums of the filter coefficients in the K×L filter size, corresponding to the pixels that are in identical positional relationship on the M×N pixels of the size of pixels sharing the amplifier, are calculated to be all equal to each other.

Fourth Embodiment of Imaging Device

Figure 13:
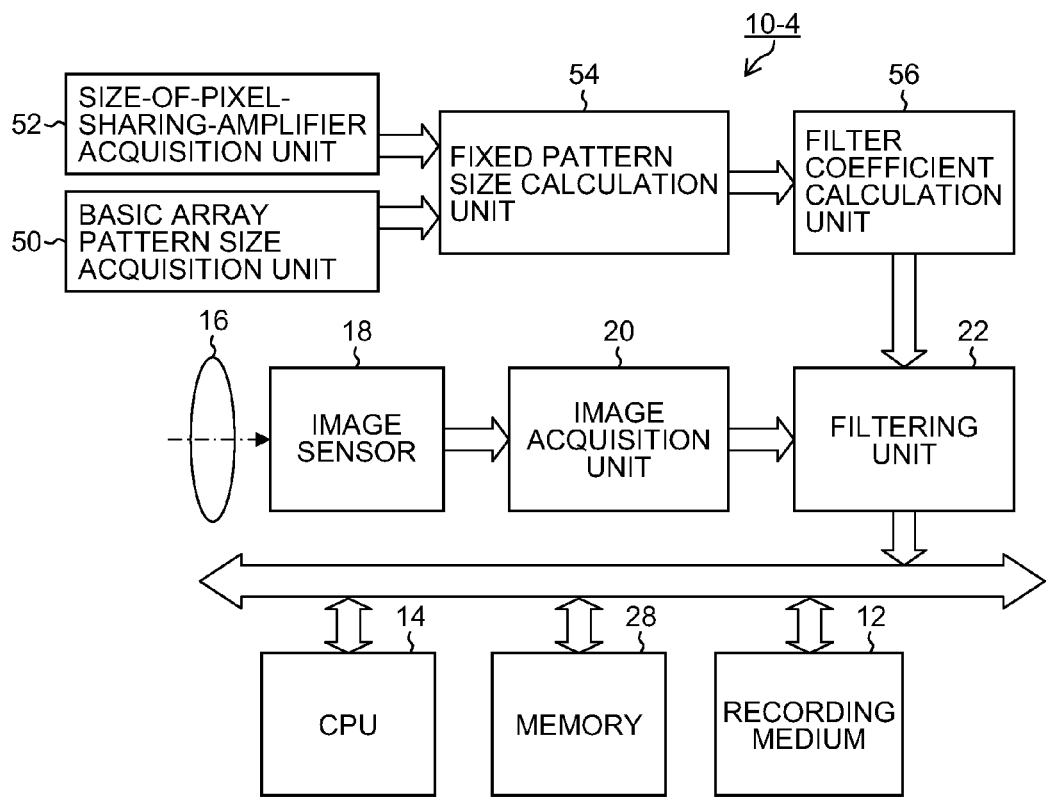
FIG. 13 is a block diagram illustrating a fourth embodiment of the imaging device according to the presently disclosed subject matter.

FIG. 13 is a block diagram illustrating a fourth embodiment of the imaging device according to the presently disclosed subject matter. It is to be noted that component members identical to those of the first embodiment illustrated in FIG. 5 are designated by identical reference numerals to omit detailed description.

An imaging device 10-4 of the fourth embodiment illustrated in FIG. 13 is different in the point that the fixed pattern size acquisition unit 24 and the filter coefficient calculation unit 26 of the first embodiment are replaced with a basic array pattern size acquisition unit 50, a size-of-pixel-sharing-amplifier acquisition unit 52, a fixed pattern size calculation unit 54, and a filter coefficient calculation unit 56.

The basic array pattern size acquisition unit 50 and the size-of-pixel-sharing-amplifier acquisition unit 52 respectively acquire a basic array pattern size and a size of pixels sharing an amplifier like the basic array pattern size acquisition unit 30 of the second embodiment illustrated in FIG. 7 and the size-of-pixel-sharing-amplifier acquisition unit 40 of the third embodiment illustrated in FIG. 10.

The fixed pattern size calculation unit 54 calculates a fixed pattern size based on the basic array pattern size and the size of pixels sharing the amplifier inputted from the basic array pattern size acquisition unit 50 and the size-of-pixel-sharing-amplifier acquisition unit 52, and outputs information indicating the calculated fixed pattern size to the filter coefficient calculation unit 56.

Figure 14A:
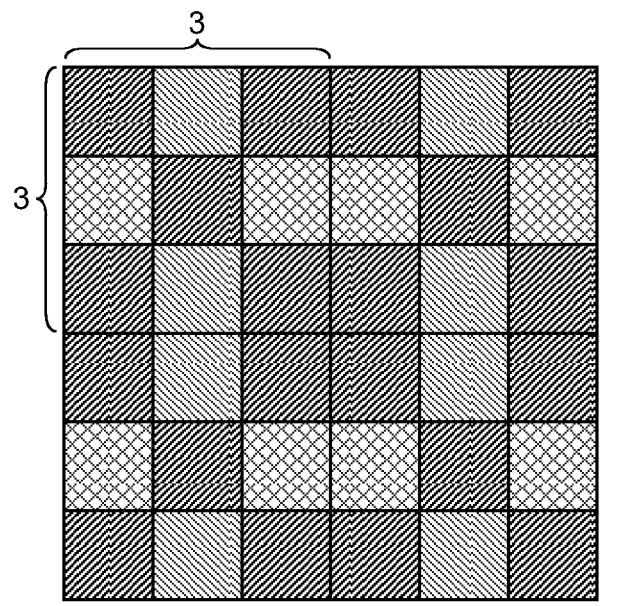
FIG. 14A is a view illustrating an example of a mosaic-like color filter array arranged on an image sensor.
Figure 14B:
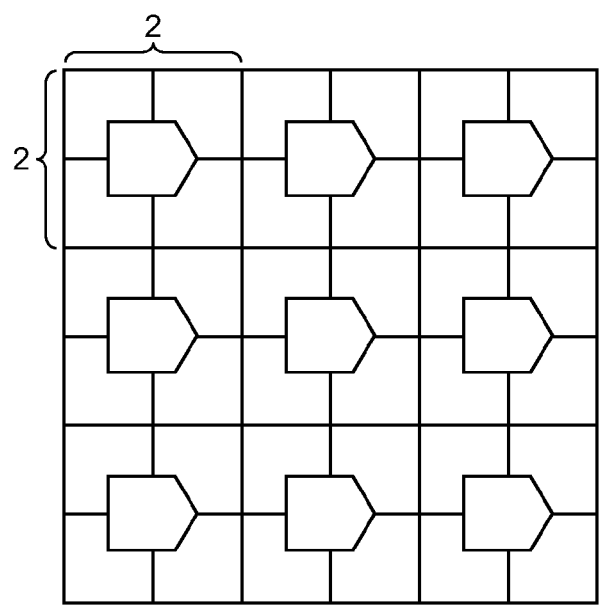
FIG. 14B is a view illustrating an example of a size of pixels sharing an amplifier of the image sensor.

As illustrated in FIGS. 14A and 14B, when the basic array pattern size is 3×3 pixels and the size of pixels sharing the amplifier is 2×2 pixels, the fixed pattern size calculation unit 54 calculates, as a fixed pattern size, 6×6 pixels that are least common multiples of these sizes in the horizontal and vertical directions. This is because the fixed pattern corresponding to the basic array pattern and the fixed pattern corresponding to the amplifier sharing pixel have a fixed pattern of a least common multiple of these fixed patterns.

The filter relating number calculation unit 56 calculates filter coefficients of a filter size, which is larger than the fixed pattern size, based on the size information indicating the fixed pattern size calculated by the fixed pattern size calculation unit 54, and imparts the calculated filter coefficients to the filtering unit 22.

Figure 15:
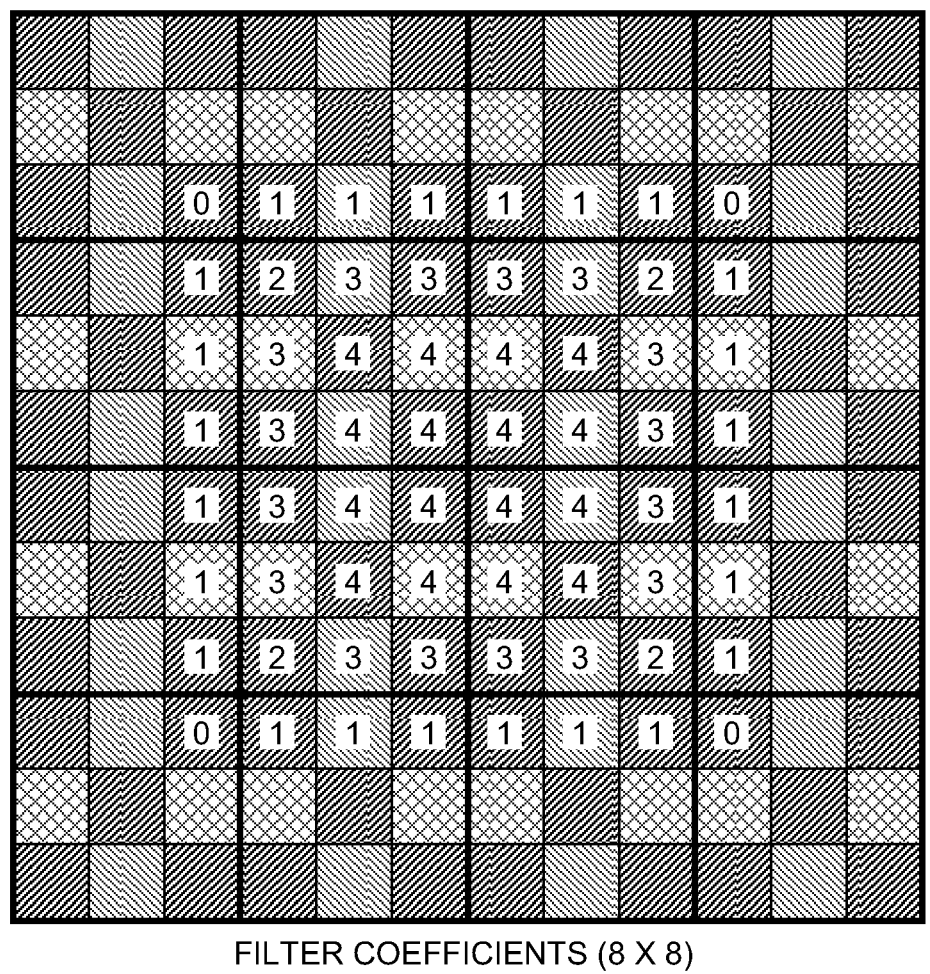
FIG. 15 is a view illustrating one example of filter coefficients for a fixed pattern reduction filter corresponding to the image sensor illustrated in FIG. 14A and FIG. 14B.

In an example illustrated in FIG. 15, filter coefficients of an 8×8 filter size are calculated for a 6×6 fixed pattern size. Moreover, the filter coefficients are set so that filter coefficients weighted to be larger in the vicinity of the center are assigned and that the sums of the filter coefficients in the 8×8 filter size, corresponding to the pixels that are in identical positional relationship on the fixed pattern size of 6×6 pixels, are all equal to each other.

By filtering in the filtering unit 22 with use of the filter coefficients calculated by the filter coefficient calculation unit 56, the fixed pattern corresponding to the size-of-pixel-sharing-amplifier can be reduced. Further, according to the present embodiment, it becomes possible to prevent losing of a detail of the filtered image.

Fourth Embodiment of Method for Image Processing

Figure 16:
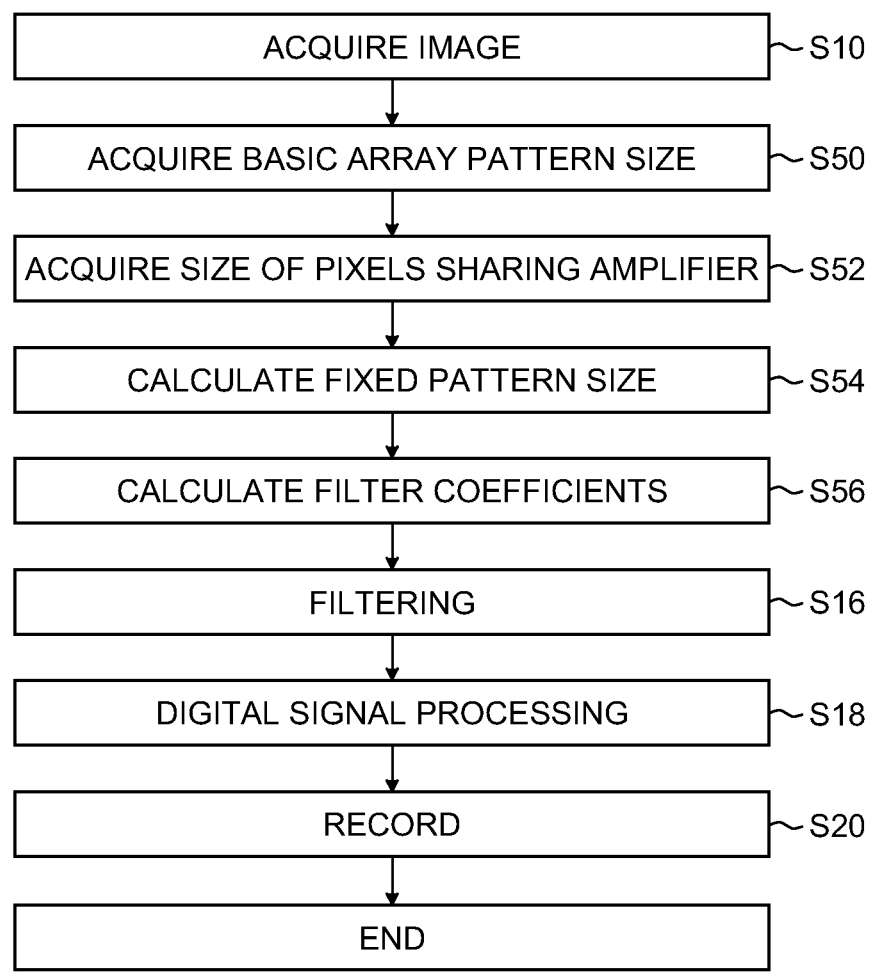
FIG. 16 is a flow chart illustrating a fourth embodiment of the method for image processing in the imaging device illustrated in FIG. 13.

FIG. 16 is a flow chart illustrating a fourth embodiment of the method for image processing in the imaging device 10-4. It is to be noted that the steps of the method for image processing identical to those of the first embodiment illustrated in FIG. 6 are designated by identical step numbers to omit detailed description.

The fourth embodiment illustrated in FIG. 16 is different from the first embodiment in the point that processing of steps S50 to S56 is performed instead of steps S12 and S14 of the first embodiment illustrated in FIG. 6.

More specifically, in step S50, a basic pattern size of the color filter array in the image sensor 18 is acquired, and in step S52, a size of pixels sharing an amplifier of the image sensor 18 is acquired.

A least common multiple of the basic pattern size and the size of pixels sharing the amplifier acquired in steps S50 and S52 is calculated as a fixed pattern size (M×N) (step S54). In step S56, filter coefficients of a filter size (K×L) (K, L: integers of M<K and N<L) which is larger than the fixed pattern size calculated in the step S54 are calculated. The filter coefficients of the filter size (K×L) are calculated so that filter coefficients weighted to be larger in the vicinity of the center are assigned and that the sums of the filter coefficients in the K×L filter size, corresponding to the pixels that are in identical positional relationship on M×N pixels of the size-of-pixel-sharing-amplifier, are calculated to be all equal to each other.

Fifth Embodiment of Imaging Device

Figure 17:
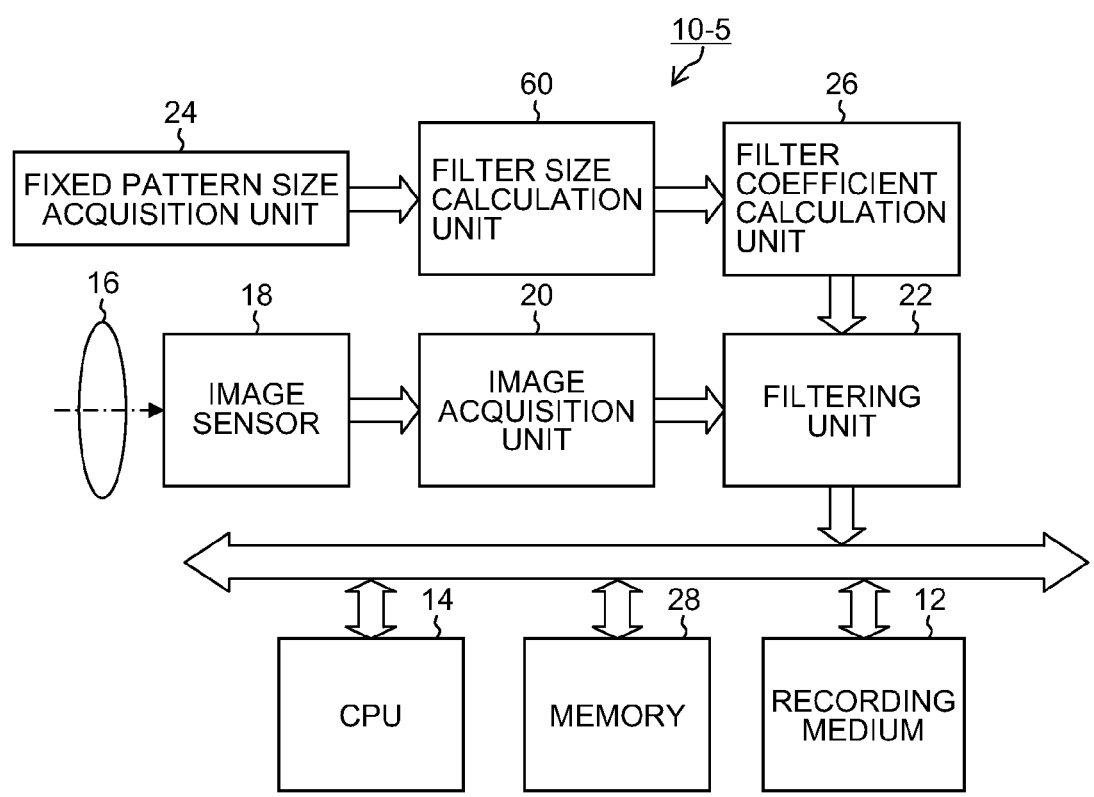
FIG. 17 is a block diagram illustrating a fifth embodiment of the imaging device according to the presently disclosed subject matter.

FIG. 17 is a block diagram illustrating a fifth embodiment of the imaging device according to the presently disclosed subject matter. It is to be noted that component members identical to those of the first embodiment illustrated in FIG. 5 are designated by identical reference numerals to omit detailed description.

An imaging device 10-5 of a fifth embodiment illustrated in FIG. 17 is different in the point that a filter size calculation unit 60 is added in between the fixed pattern size acquisition unit 24 and the filter coefficient calculation unit 26 of the first embodiment.

Figures 18A, 18B:
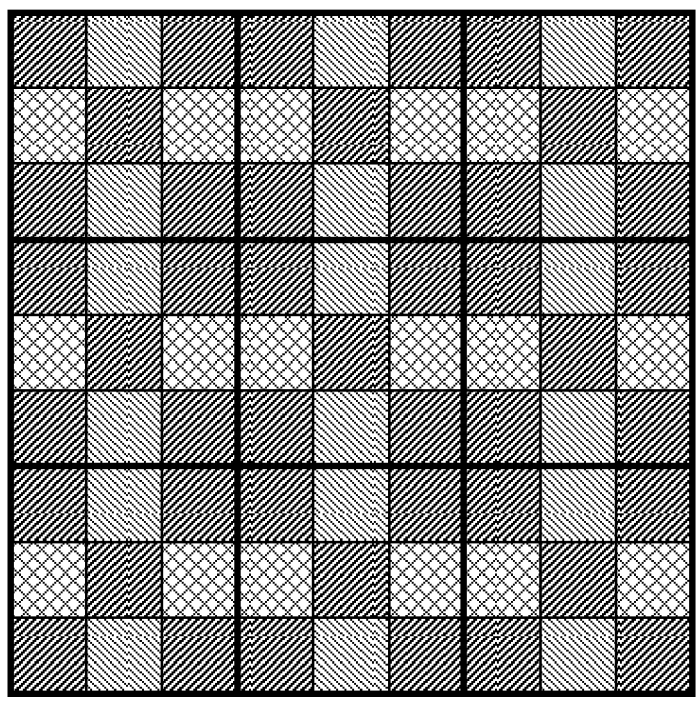
FIG. 18A is a view illustrating still another example of the mosaic-like color filter array arranged on the image sensor.
FIG. 18B is a view illustrating one example of filter coefficients for a fixed pattern reduction filter corresponding to the color filter array illustrated in FIG. 18A.

The fixed pattern size acquisition unit 24 acquires a fixed pattern size corresponding to the repeating cycles of the pixel configuration in the image sensor 18, and outputs size information indicating the fixed pattern size to the filter size calculation unit 60. For example, in the case of an image sensor having a color filter array including a basic array pattern of 3×3 pixels as illustrated in FIG. 18A, size information indicating the 3×3 fixed pattern size is outputted to the filter size calculation unit 60.

The filter size calculation unit 60 calculates filter coefficients of a filter size, which is larger than the fixed pattern size, based on the size information indicating the fixed pattern size inputted from the fixed pattern size acquisition unit 24. More specifically, when the fixed pattern size is M×N (M, N: integers of 2 or more) pixels, the filter size calculation unit 60 calculates a K×L (K, L: integers of M<K and N<L) filter size. In the case of a basic array pattern (fixed pattern size) of 3×3 pixels as illustrated in FIG. 18A, a filter size (for example, 5×5) larger than 3×3 is calculated as illustrated in FIG. 18B.

The filter coefficient calculation unit 26 calculates filter coefficients corresponding to the filter size (K×L) inputted from the filter size calculation unit 60. Filter coefficients of 5×5 are calculated in an example illustrated in FIG. 18B. Moreover, the filter coefficients are set so that filter coefficients weighted to be larger in the vicinity of the center are assigned and that the respective sums of the filter coefficients in the 5×5 filter size, corresponding to the pixels that are in identical positional relationship on the basic array pattern of 3×3 pixels, are all equal to each other.

By filtering in the filtering unit 22 with use of the filter coefficients calculated by the filter coefficient calculation unit 26, the fixed pattern can be reduced. Further, it becomes possible to prevent losing of a detail of the filtered image.

Fifth Embodiment of Method for Image Processing

Figure 19:
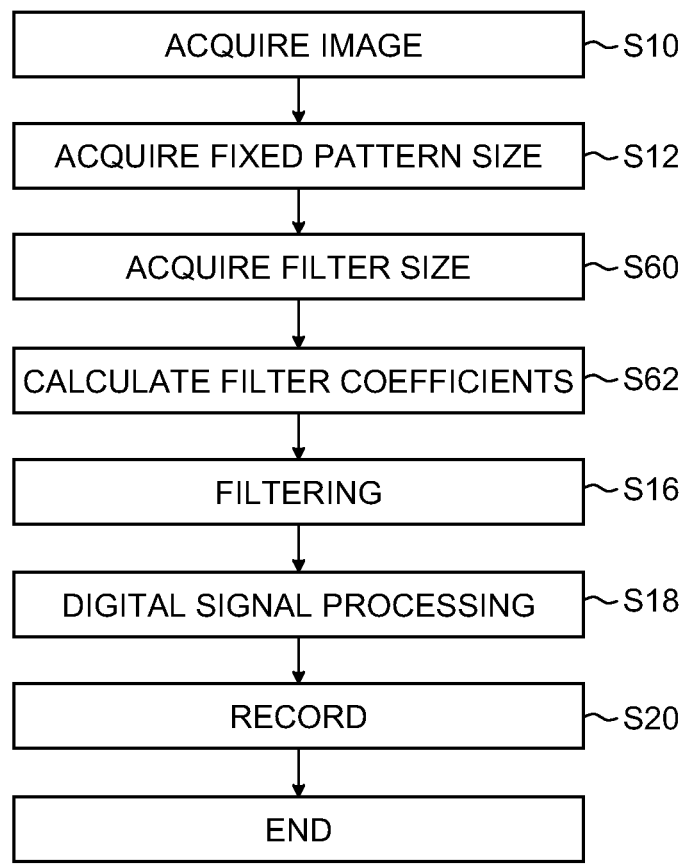
FIG. 19 is a flow chart illustrating a fifth embodiment of the method for image processing in the imaging device illustrated in FIG. 17.
Figure 20:
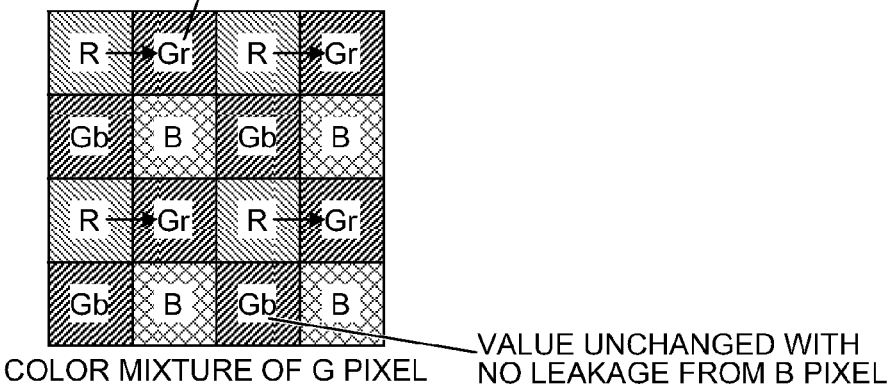
FIG. 20 is a view illustrating one example of a color filter array provided on the image sensor.
Figure 21:
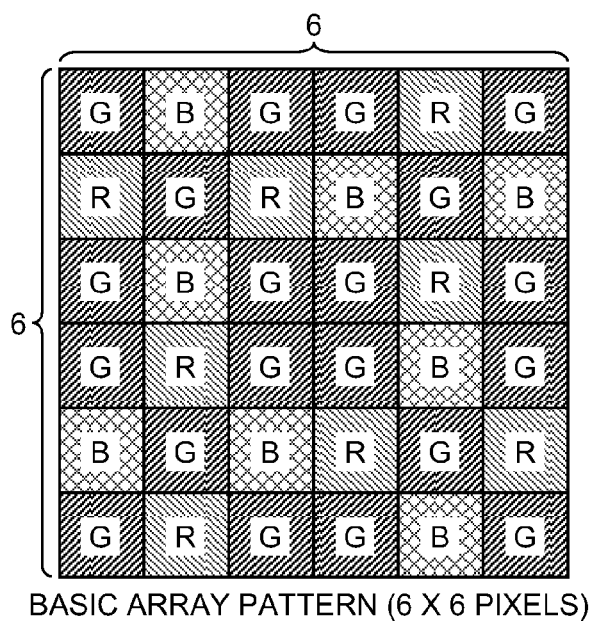
FIG. 21 is a view illustrating a new mosaic-like color filter array proposed by an applicant of the presently disclosed subject matter.
Figure 22:
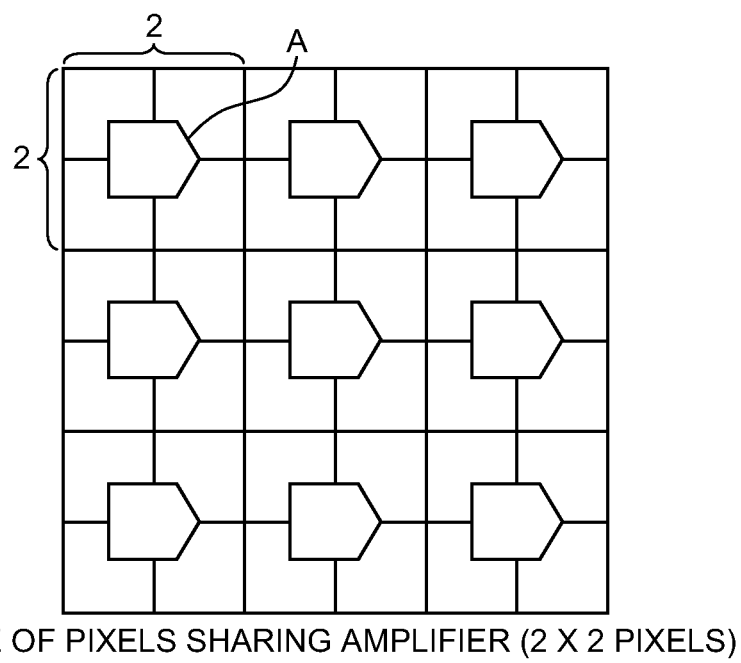
FIG. 22 is a view illustrating an example of a size of pixels sharing an amplifier of a CMOS-type image sensor.

FIG. 19 is a flow chart illustrating a fifth embodiment of the method for image processing in the imaging device 10-5. It is to be noted that the steps of the method for image processing identical to those of the first embodiment illustrated in FIG. 6 are designated by identical step numbers to omit detailed description.

The fifth embodiment illustrated in FIG. 19 is different from the first embodiment in the point that processing of steps S60 and S62 is performed instead of step S14 of the first embodiment illustrated in FIG. 6.

More specifically, in step S60, based on the fixed pattern size (M×N) acquired in step S12, a filter size (K×L) (K, L: integers of M<K and N<L) larger than the fixed pattern size is calculated. In step S62, filter coefficients corresponding to the filter size calculated in step S60 is calculated. The filter coefficients of the filter size (K×L) are calculated so that filter coefficients weighted to be larger in the vicinity of the center are assigned and that the sums of the filter coefficients in the K×L filter size, corresponding to the pixels that are in identical positional relationship on M×N pixels of the fixed pattern, are calculated to be all equal to each other.

Others

According to the above embodiments, the filter coefficients are calculated by the filter coefficient calculation unit. Note that once an image sensor of the imaging device is determined, a fixed pattern corresponding to repeating cycles of the pixel configuration in the image sensor is also determined. Accordingly, the filter coefficients of a filter for reducing the fixed pattern can be calculated in advance. Therefore, the filter coefficients calculated in advance may be stored in a non-volatile memory beforehand, and the filter coefficients may be read from the non-volatile memory at the time of filtering.

The basic array pattern of the color filter to which the presently disclosed subject matter can be applied is not limited to the color filters of R, G and B three colors as in the above embodiments but may be any basic array pattern including color filters of at least three colors. The presently disclosed subject matter is applicable to color filters of four or more colors, such as emerald (E) and white (W) filters added to R, G, and B filters. In that case, M and N in the size (M×N) of the basic array pattern are integers of 3 or more.

Further, although the CMOS type image sensor was described as an example of the image sensor in which every specified pixel group has a shared amplifier, the presently disclosed subject matter is applicable not only to the CMOS type image sensor but also to MOS type and XY address type image sensors.

Moreover, although the imaging device having an image processing device including fixed pattern reduction processing has been described in the present embodiment, image processing including the fixed pattern reduction processing may be executed by an external image processing device. In that case, in the imaging device, fixed pattern reduction processing of the presently disclosed subject matter may be executed when a mosaic image (RAW data) not yet subjected to image processing is stored and the RAW data is RAW-developed by the external image processing device. Moreover, an image processing program including fixed pattern reduction processing according to the presently disclosed subject matter and a non-transitory recording medium storing the image processing program may be build into a RAW developing software dedicated to imaging devices.

Furthermore, it should naturally be understood that the presently disclosed subject matter is not limited to the above described embodiments and various modifications are possible without departing from the spirit of the presently disclosed subject matter.

What is claimed is:

1. An image processing device, comprising:
an image acquisition device configured to acquire an image taken by an imaging device including an image sensor having pixel configuration with repeating cycles of M×N (M, N: integers of 2 or more) pixels; and
a filtering device having a filter with a K×L (K, L: integers of M<K and N<L) filter size, the filtering device configured to apply convolution arithmetic operation to filter coefficients set for the filter and pixel values of K×L pixels extracted based on a target pixel in the image acquired by the image acquisition device so as to calculate a pixel value of the target pixel,
wherein the filter coefficients set for the filter are weighted to be larger in a vicinity of a center of the filter, and the filter coefficients are set so that sums of the filter coefficients in the filter size, which filter coefficients correspond to pixels that are in identical positional relationship on the pixel configuration of M×N pixels, are all equal to each other.

2. The image processing device according to claim 1,
wherein the image sensor is a color image sensor in which a specified basic array pattern including color filters of three colors is arranged in a repeated manner in a horizontal direction and a vertical direction on a plurality of pixels arrayed in the horizontal direction and the vertical direction, and
the pixel configuration with the repeating cycles of M×N pixels corresponds to the specified basic array pattern.

3. The image processing device according to claim 1,
wherein the image sensor is an image sensor having sensor configuration in which an amplifier is shared for every specified pixel group, and
the pixel configuration with the repeating cycles of M×N pixels corresponds to the specified pixel group.

4. The image processing device according to claim 1,
wherein the image sensor is a color image sensor having sensor configuration in which a specified basic array pattern including color filters of three colors is arranged in a repeated manner in a horizontal direction and a vertical direction on a plurality of pixels arrayed in the horizontal direction and the vertical direction and an amplifier is shared for every specified pixel group, and
the repeating cycles of M×N pixels in the pixel configuration are repeating cycles of a least common multiple of the specified basic array pattern and the specified pixel group.

5. The image processing device according to claim 2,
wherein the basic array pattern includes color filters of three primary colors which are red (R), green (G) and blue (B), and
the basic array pattern is a square array pattern corresponding to N×N (N: an integer of 3 or more) pixels.

6. The image processing device according to claim 4,
wherein the basic array pattern includes color filters of three primary colors which are red (R), green (G) and blue (B), and
the basic array pattern is a square array pattern corresponding to N×N (N: an integer of 3 or more) pixels.

7. The image processing device according to claim 2,
wherein the filtering device applies convolution arithmetic operation to a target pixel among K×L pixels in an area to be processed with the filter, pixel values of pixels corresponding to a color filter, a color of which is identical to a color filter of the target pixel, and filter coefficients of the filter corresponding to these pixels so as to calculate a pixel value of the target pixel.

8. The image processing device according to claim 4,
wherein the filtering device applies convolution arithmetic operation to a target pixel among K×L pixels in an area to be processed with the filter, pixel values of pixels corresponding to a color filter, a color of which is identical to a color filter of the target pixel, and filter coefficients of the filter corresponding to these pixels so as to calculate a pixel value of the target pixel.

9. The image processing device according to claim 5,
wherein the filtering device applies convolution arithmetic operation to a target pixel among K×L pixels in an area to be processed with the filter, pixel values of pixels corresponding to a color filter, a color of which is identical to a color filter of the target pixel, and filter coefficients of the filter corresponding to these pixels so as to calculate a pixel value of the target pixel.

10. The image processing device according to claim 6,
wherein the filtering device applies convolution arithmetic operation to a target pixel among K×L pixels in an area to be processed with the filter, pixel values of pixels corresponding to a color filter, a color of which is identical to a color filter of the target pixel, and filter coefficients of the filter corresponding to these pixels so as to calculate a pixel value of the target pixel.

11. The image processing device according to claim 1, further comprising:
a fixed pattern size acquisition device configured to acquire a fixed pattern size corresponding to M×N pixels that represent repeating cycles of the pixel configuration in the image sensor; and
a filter coefficient calculation device having filter coefficients weighted to be larger in the vicinity of the center of the filter based on the acquired fixed pattern size, the filter coefficient calculation device being configured to calculate the filter coefficients so that sums of the filter coefficients in the filter size, which filter coefficients correspond to pixels that are in identical positional relationship on the sensor configuration of M×N pixels, are all equal to each other,
wherein the filtering device acquires the filter coefficients calculated by the filter coefficient calculation device.

12. The image processing device according to claim 11,
wherein the image sensor is a color image sensor in which a specified basic array pattern including color filters of three colors is arranged in a repeated manner in a horizontal direction and a vertical direction on a plurality of pixels arrayed in the horizontal direction and the vertical direction, and
the fixed pattern size acquisition device acquires a size of the specified basic array pattern as the fixed pattern size.

13. The image processing device according to claim 11,
wherein the image sensor is an image sensor having sensor configuration in which an amplifier is shared for every specified pixel group, and
the fixed pattern size acquisition device acquires, as the fixed pattern size, an image size of the specified pixel group that shares the amplifier.

14. The image processing device according to claim 11,
wherein the image sensor is a color image sensor having sensor configuration in which a specified basic array pattern including color filters of three colors is arranged in a repeated manner in a horizontal direction and a vertical direction on a plurality of pixels arrayed in the horizontal direction and the vertical direction and an amplifier is shared for every specified pixel group, and
the fixed pattern size acquisition device acquires, as the fixed pattern size, a size that is a least common multiple of the size of the specified basic array pattern and the image size of the specified pixel group that shares the amplifier.

15. The image processing device according to claim 11, comprising
a filter size calculation device configured to calculate the K×L filter size of based on the fixed pattern size of M×N,
wherein the filter coefficient calculation device calculates filter coefficients corresponding to the filter size calculated by the filter size calculation device.

16. A method for image processing, comprising:
a step of acquiring an image taken by an imaging device including an image sensor having pixel configuration with repeating cycles of M×N (M, N: integers of 2 or more) pixels;
(a) a step of setting a target pixel in the acquired image and extracting K×L (K, L: integers of M<K and N<L) pixels based on the target pixel;
(b) a step of having a filter with a K×L filter size and applying convolution arithmetic operation to filter coefficients set for the filter and pixel values of the extracted K×L pixels so as to calculate a pixel value of the target pixel; and
(c) a step of repeatedly executing the step (a) and the step (b) while moving the target pixel one pixel at a time with respect to the acquired image,
wherein the filter coefficients set for the filter are weighted to be larger in a vicinity of a center of the filter, and the filter coefficients are set so that sums of the filter coefficients in the filter size, which filter coefficients correspond to pixels that are in identical positional relationship on the sensor configuration of M×N pixels, are all equal to each other.

17. A computer-readable non-transitory recording medium including instructions stored thereon, such that when the instructions are read and executed by a processor, the processor is configured to perform:
a step of acquiring an image taken by an imaging device including an image sensor having pixel configuration with repeating cycles of M×N (M, N: integers of 2 or more) pixels;
(a) a step of setting a target pixel in the acquired image and extracting K×L (K, L: integers of M<K and N<L) pixels based on the target pixel;
(b) a step of having a filter of a K×L filter size and applying convolution arithmetic operation to filter coefficients set for the filter and pixel values of the extracted K×L pixels so as to calculate a pixel value of the target pixel; and
(c) a step of repeatedly executing the step (a) and the step (b) while moving the target pixel one pixel at a time with respect to the acquired image,
wherein the filter coefficients set for the filter are weighted to be larger in a vicinity of a center of the filter, and the filter coefficients are set so that sums of the filter coefficients in the filter size, which filter coefficients correspond to pixels that are in identical positional relationship on the sensor configuration of M×N pixels, are all equal to each other.

18. An imaging device, comprising:
an imaging device including a photographing optical system and an image sensor configured to form a subject image via the photographing optical system;
the image acquisition device configured to acquire an image outputted from the imaging device; and
the image processing device according to claim 1.

* * * * *